(12) United States Patent
Boylan

(10) Patent No.: US 11,291,928 B2
(45) Date of Patent: Apr. 5, 2022

(54) SYSTEM AND METHOD FOR DISTILLATION

(71) Applicant: David Bradley Boylan, Encinitas, CA (US)

(72) Inventor: David Bradley Boylan, Encinitas, CA (US)

(73) Assignee: Burner Technology and Research, Inc., Carlsbad, CA (US)

(*) Notice: Subject to any disclaimer, the term of this patent is extended or adjusted under 35 U.S.C. 154(b) by 319 days.

(21) Appl. No.: 16/536,286

(22) Filed: Aug. 8, 2019

(65) Prior Publication Data

US 2021/0039010 A1    Feb. 11, 2021

Related U.S. Application Data

(62) Division of application No. 15/084,443, filed on Mar. 29, 2016, now Pat. No. 10,421,030.

(60) Provisional application No. 62/146,259, filed on Apr. 11, 2015.

(51) Int. Cl.
| | |
|---|---|
| *B01D 3/00* | (2006.01) |
| *B01D 1/16* | (2006.01) |
| *B01D 3/34* | (2006.01) |
| *C12H 6/02* | (2019.01) |
| *C12H 1/08* | (2006.01) |
| *B01D 3/42* | (2006.01) |

(52) U.S. Cl.
CPC ............ *B01D 3/005* (2013.01); *B01D 1/16* (2013.01); *B01D 3/343* (2013.01); *C12H 1/08* (2013.01); *C12H 6/02* (2019.02); *B01D 3/42* (2013.01)

(58) Field of Classification Search
CPC .......... B01D 1/16; B01D 3/001; B01D 3/002; B01D 3/003; B01D 3/004; B01D 3/005; B01D 3/42; B01D 3/343; C12H 1/08; C12H 6/02; Y02E 50/10
See application file for complete search history.

(56) References Cited

U.S. PATENT DOCUMENTS

| | | | |
|---|---|---|---|
| 2,042,488 A * | 6/1936 | Theiler ................... | B01D 1/08 159/47.1 |
| 4,327,184 A * | 4/1982 | Johnson ................. | B01D 3/346 435/300.1 |

* cited by examiner

*Primary Examiner* — Jonathan Miller
*Assistant Examiner* — Gabriel E Gitman
(74) *Attorney, Agent, or Firm* — CK IP Law

(57) ABSTRACT

The system and methods described are directed to a distillation system and method having an evaporator tank with a wall surrounding an interior evaporator tank area. A non-oxidizing gas line is disposed at least partially outside the evaporator tank in communication with the interior evaporator tank area, wherein the non-oxidizing gas line introduces a non-oxidizing gas into the interior evaporator tank; the interior evaporator tank area is generally at or above an ambient atmospheric pressure.

3 Claims, 4 Drawing Sheets

SYSTEM AND METHOD FOR DISTILLATION

CROSS-REFERENCE TO RELATED APPLICATIONS

This application claims the benefit of U.S. Provisional Application Ser. No. 62/146,259 filed Apr. 11, 2015; and U.S. Non-Provisional application Ser. No. 15/084,443 filed Mar. 29, 2016, which are hereby incorporated by reference in their entirety.

TECHNICAL FIELD

The embodiments described herein are generally directed to a system and method used in a low temperature distillery for the production of consumable spirits.

BACKGROUND

Presently, most distilleries use a conventional distillation process that requires temperature heat inputs (approx. 250° Fahrenheit) and distillation temperatures from 190° Fahrenheit (F) to 205° F. The following discussions describe concerns raised by this approach.

Heat input sources: A quality fuel is needed to produce the required heat for vaporization of the water into steam. Generally, the source of the heat is a fossil fuel burner. This produces carbon dioxide associated with global warming, and removes a resource fuel that is better used elsewhere. In addition, subjecting the beer to these higher temperatures during distillation causes the production of unwanted volatile organic materials that can have a detrimental effect on the quality of the consumable spirit. In traditional distilleries often the liquor is subjected to multiple distillations and increasingly smaller cuts to remove some of these unwanted materials. This is energy wasting and effects product efficiency.

Alternate heat sources: Over thirty percent (30%) of the heat produced in the United States is lost due to the low quality of the heat byproduct and the lack of technology to take advantage of this very large resource. In addition, heat output from solar thermal and geothermal waste water systems also falls in this range as does the heat recovered from cogeneration systems. There is plenty of low-grade waste heat and potential solar or geothermal generated heat in the 120° F.-155° F. ranges.

Oxygen exposure: Oxygen reacts with alcohol and other volatile organics including desired flavor producing compounds to produce an off-taste distillate. In addition, compounds can be produced that are toxic and produce hangover symptoms. These reactions are enhanced at the higher temperatures used in traditional distilleries. Minimizing the amount of oxygen in the distillation environment is therefore desirable for the production of a higher quality distillate.

High temperature effects on distilled spirit quality: High temperatures in the temperature range (190° F.-225° F.) used in traditional distilleries has a detrimental effect on distillers beer quality. At the higher temperatures there is a greater chance of cross reactions occurring in the beer especially if oxygen is not minimized. Also, there are yeast and yeast-by-products that are present in the beer that are heat sensitive. Yeast cells can be destroyed in the (190° F.-225° F.) temperate range, releasing chemicals into the beer. Some of these materials produced in the beer at high temperatures can be distilled and can produce off flavor spirit product and hangover symptoms. It is therefore desirable to distill at lower temperatures where these high temperature induced changes are minimized.

SUMMARY

In an exemplary embodiment and description, a system and method are presented that allow production of distillate alcohol at atmospheric pressure, in an environment where oxygen is minimized, at temperatures in the 120° Fahrenheit (F) to 155° F. range. Such a system reduces some of the variables that produce unwanted compounds that have a detrimental effect on the quality of the spirit product during distillation. In addition, if the operation is performed in the low-quality heat range (120° F. to 155° F.) there are many waste heat resources or environment derived heat resources that can be used to power the distillation process. Because the distillation is conducted at atmospheric pressure and in a minimized oxygen environment, the process is simple to operate both manually and automatically, is inexpensive to build (there are many inexpensive materials that can be used for still construction in this temperature range) and is safer to operate.

One desirable aspect of the present description is a low temperature distillery for the production of quality spirits from various distiller's beer sources. The distillate system includes a feed tank containing a heat exchanger for producing a heated fermentation product, a pump for pumping the heated distillers beer into spray nozzles in the evaporator tank, a way to recycle un-evaporated distillers beer from the evaporator back into the feed tank where it is reheated and re-injected, a carrier gas (preferably nitrogen) injection system mounted in the evaporator, a blower that recycles the carrier gas and un-condensed vapor through evaporator and the rest of the system, a knockout pot for removal of entrained liquid from the vapor/carrier gas exiting the evaporator, condenser tank(s) for condensing alcohol containing vapor and a condensate product removal pipe, a pressure regulation system that will keep the system at a pressure slightly above atmospheric pressure, a vent for removal of excess carrier gas, a blower for recycle of carrier gas and un-condensed vapors and a gate valve to regulate the rate of carrier gas/uncondensed vapor recycle.

A second desirable aspect is the use of the above-described system to produce potable water from ocean water, brackish water, or dirty water sources or the system may be used to clean up industrial waste effluent and to purify chemicals that are volatile including those that are temperature sensitive or oxygen sensitive (in cases where oxygen sensitivity is not present, air can be used directly as the carrier gas). Accordingly, the exemplary embodiment and disclosure of the system and method are intended to provide some of the aspects of the claimed system and method, and are not intended to restrict the scope of the claims herein.

A third desired aspect of the described system is that heat required for the initial stripping of alcohol from heated beer is usually in the (125° F.-150° F.) range. Recovered waste heat from industrial processes or from environmental inputs can provide this heat thus lowering or eliminating the usual main cost (energy) incurred by a conventional distillery. Further rectification of the initial product (50-60% alcohol) from the described system, as is needed in the production of vodka (law requires distillation to 95% alcohol), can be accomplished at much lower overall cost even if the secondary process is conventional.

A fourth desired aspect of the described system is that it significantly reduces the higher boiling fusel oils due to the low temperature and low oxygen that the beer is exposed to and the low temperature of distillation. Some of these higher boiling fusel oil compounds produce off taste and have been linked to hangover symptoms. A secondary distillation (such as needed in vodka production) even if the secondary process is conventional, will not decrease product quality.

A fifth desired aspect of the described system or method is the ability to utilize solar power, waste heat and other sustainable power sources including but not limited to wind, geothermal, wave action, geothermal, and the like sources that can be expensed as capital expenses. This is a paradigm shift in energy accounting. This approach allows the volatile, variable cost of energy to be converted into a fixed capitol expense. The majority of the cost of operation is no longer the cost of fuel. It is now the cost of equipment (solar panels and support systems including heat exchangers) that is predictable and depreciable.

BRIEF DESCRIPTION OF THE DRAWINGS

FIG. 2 is an explanatory view of the evaporator part of the distillery embodied in the present description.

FIG. 3 is an explanatory view of the knockout pot/rectifier in the distillery embodied in the present description.

FIG. 4 is an explanatory view of the condenser (s) in the distillery embodied in the present description.

FIG. 5 is an explanatory view of the pressure regulator and vent as well as the blower and gate valve in the distillery embodied in the present description.

FIG. 6 is an explanatory view of the heated feed tank, which includes the heat exchanger, the heated recycle pump and the lines leading to the spray heads in the evaporator and the lines returning used feed from the evaporator to the heated feed tank all included in the distillery embodied in the present description.

FIG. 7 is an explanatory view of the heated liquid tank, whose contents are pumped through the heated feed tank heat exchanger and also pumped through the solar thermal heaters or other low grade or conventional heat source (s), which is included in the distillery embodied in the present description.

DETAILED DESCRIPTION

Figure 1:
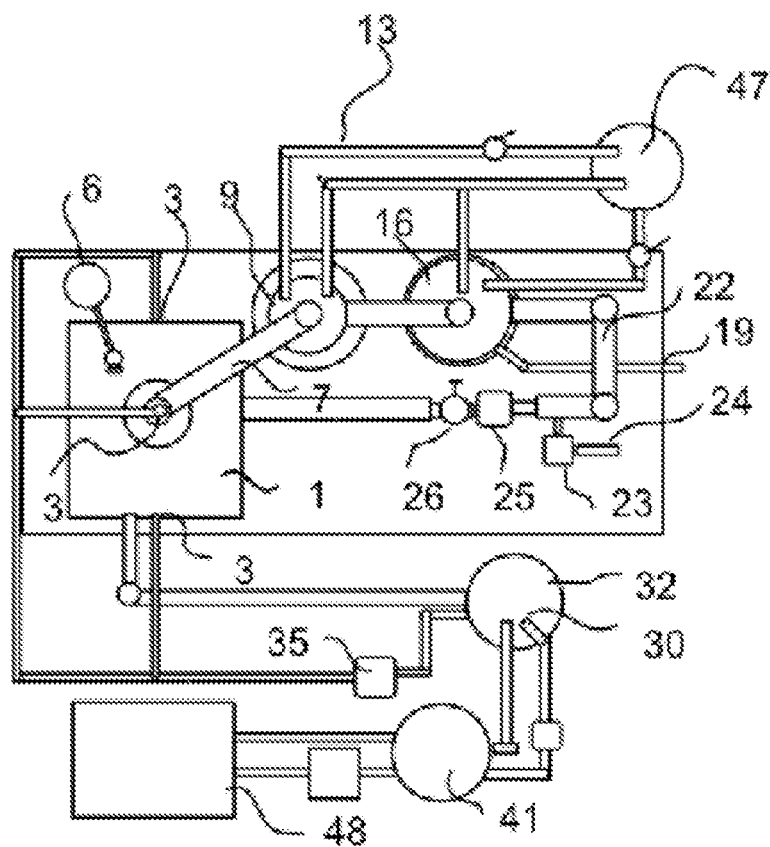
FIG. 1 is an overhead view of an exemplary embodiment of the claimed distillery system provided in the present description.

The embodiments described herein are not intended to be exhaustive or otherwise limit or restrict the claims to the precise form and configuration disclosed in the following detailed description.

The term "beer" and any variation thereof including "distiller's beer" as used throughout the specification is defined hereinafter to mean: fermented pre-distilled product used in the distillation of consumable spirits. Beer is the fermented liquid that is sprayed into the evaporator tank (1) of the distillation system of FIGS. 1-7 and further described below.

The term "low temperature" and any variation thereof as used throughout the specification is defined hereinafter to include: temperatures in the 120° Fahrenheit (F) to 155° F. range and as further described below.

The term "knock-out pot" and any variation thereof as used throughout the specification is defined to mean but is not limited to: a vapor-carrier gas/liquid separator device used to separate entrained, non-evaporated liquid droplets from the vapor-carrier gas stream and as further described and illustrated herein.

The term "rectifier" and any variation thereof as used throughout the specification is defined to mean but is not limited to: a process that concentrates the more volatile species in a volatile gas mix through countercurrent liquid/vapor contact. When coolant is passed through the heat exchanger mounted in the knock-out pot, the pot also serves as a rectifier in the sense that some condensed vapors from the carrier gas vapor stream coat porous stainless-steel sponge (packing material) wrapped around the heat exchanger. Vapor contact with the liquid coated surfaces affects an increase in alcohol content in that vapor.

The term "carrier gas" and any variation thereof as used throughout the specification is defined to mean but is not limited to: The gas resulting from injecting a non-oxidizing gas into the system to displace a desired portion of the air present. Any non-oxidizing gas is contemplated including but not limited to nitrogen.

The term "line" and any variation thereof as used throughout the specification is defined to mean but is not limited to: a structure that conveys a fluid and/or a gas or functions as a passage. The term line includes an aperture between structures.

The term "non-oxidizing gas" and any variation thereof as used throughout the specification is defined to include but is not limited to: an inert gas including but not limited to nitrogen, argon, and the like, and any variation or combination. The term "non-oxidizing gas" includes a gas used generally to avoid or limit oxidation.

FIGS. 1-7 illustrate an exemplary system of a distillery having an evaporator tank (1) that serves as a vapor generating system when heated feed such as beer, as one example discussed here in the exemplary system, from the heated feed tank (32) is sprayed into the interior of evaporator tank (1). The vapors are carried by a circulating carrier gas (a desired amount of non-oxidizing gas is introduced into the system to reduce the amount of air and used to maintain a slight positive pressure during operation) into a knockout pot (9). Nitrogen is described here as the main component of the carrier gas but any non-oxidizing gas may be used. Any entrained liquid coming from the evaporator tank (1) is removed by the knockout pot (9). If a higher alcohol percentage distillate is desired, the rectifier heat exchange coils (10) of the knockout pot (9) may be activated. The carrier gas/vapor then flows into one or more chilled condenser tank(s) (16) where the vapor is condensed into a liquid alcohol distillate product. This distillate product can be withdrawn from the condenser tank(s) 16 through line 19. The remaining uncondensed vapor/carrier gas mix flows through an exit line (21) into line (22) to a blower (25) and is recycled into the evaporator tank (1). A hydrostatic pressure regulating system is located in communication with the line (22) includes a hydrostatic pressure regulator (23) and a vent (24) that allows excess carrier gas/vapor to escape where it can be sampled by an oxygen sensor (not shown).

Heating and cooling the carrier gas/vapor during recycle provides the momentum for vapor formation and vapor condensation. As the cool carrier gas/vapor and uncondensed vapors entering the evaporator tank (1) come in contact with heated beer that is sprayed into it through a nozzle system having spray heads (3a, 3b, 3c), the gasses are heated thus increasing their ability to carry more vapor. A portion of the injected heated beer evaporates and the resulting saturated gas mixture (carrier gas and vapor) is first treated to remove entrained liquid and then passed into the condenser tank(s) (16) where the mix is cooled. The cool carrier gas has a decreased vapor saturation capacity leading to condensation of some of the vapor. A larger temperature differential between the heated carrier/vapor entering the condenser (16) and the cooler carrier gas leaving the condenser results in an increase in condensate product. Any vapor not condensed gets recycled with the carrier gas back into the evaporator (1) for another pass. Carrier gas at different temperatures has different saturation points. The higher the temperature, the higher the saturation point the more vapor in the carrier gas. However, saturation can occur at any temperature. This embodiment takes advantage of this characteristic and can theoretically distill volatile compounds at any temperature as long as the temperature differential between the carrier gas/vapor leaving the evaporator is greater that the temperature of the carrier gas/vapor leaving the condenser. With beer solutions (alcohol/water mix) the lowest temperature range that gives a reasonable distillation rate is generally 120° F. for high alcohol beer concentrations (>8%) to 155° F. for low alcohol beer concentrations (<0.5%).

The desired carrier gas recycle rate controlled by the gate valve (26) in the system varies depending on the temperature range selected. This is determined by minimizing the time it takes to distill a given amount of alcohol solution under set temperature conditions. Finally, the minimal introduction of carrier gas into the system should be maintained during operation, in order to keep a slight positive pressure in the system (0.2-1.0 in of water pressure). As temperature varies, the internal pressure varies. In operation, a slight positive pressure of the very low oxygen containing carrier gas during start up and shut down times should be maintained. The level of oxygen in the carrier gas can be determined using an oxygen probe placed in the carrier gas vent tube (24) coming from the hydrostatic system pressure regulator (23).

All materials that contact beer, alcohol vapor, or distillate in the provided embodiment of FIGS. 1-7 are made of stainless steel. Pipe or tank connecting fittings are quick-connect fittings. All tanks contain manhole access areas. The system can be easily disassembled and cleaned. The blower and pumps in the system are explosion proof and the system is well grounded.

During distillation, the quality of the product is often affected by the quality of the water used in the fermentation. The system illustrated in FIGS. 1-7 can also serve as watery. Sea water can be desalinated or stream or brackish waters can be purified using the same distillery system described above. The temperature range of operation would have to be raised to 145° F. to 165° F. in water distillation applications.

Under normal operation, pond water or ocean water at or below 75° F. can be used as the coolant. In dry areas, evaporative cooling can be used to chill recycled water.

Possible heat sources are many. The operational temperature range is low, allowing the use of waste heat from industrial processes to be used to power the system. The heat range is excellent for use of recovered heat from cogeneration operations as well as heat produced by solar thermal or geothermal facilities.

Construction materials are not limited to stainless steel. In other applications such as desalination or some industrial applications such as production of alternative fuels or in the recycle or treatment waste products or in waste reduction applications, it is better to use plastic materials that are resistant to corrosive environments and less expensive. The low temperature ranges and atmospheric pressure operational parameters allow different systems to be constructed using various building materials. The least expensive options can be tailored to the specific conditions that best meet the needs of the process.

Hereinafter, the alcohol water distillery system described in the embodiment of FIGS. 1-7 will be explained with the use of the drawings. In the present embodiment, the distilled alcohol production system utilizes different source distiller's beers as feed stocks to produce products that can be used directly as consumable spirits or can serve as a base for the production of other more complex consumable liquors.

Referring to FIG. 1, a configuration of an exemplary embodiment of a distillery system is shown in the overhead view. In all of the discussions below, the fermented pre-distilled product used in the distillation will be referred to as the distiller's beer or just beer. A non-oxidizing gas such as but not limited to nitrogen is introduced into the distillation system displacing a desired portion of the air present in the system. An oxygen probe at vent (24) is used to determine whether the air displacement by the non-oxidizing gas is adequate prior to or during distillation. The distillation system has a hydrostatic pressure regulation device (23) that maintains a slight positive pressure within the distillation system.

The gas resulting from injecting non-oxidizing gas into the system to displace a desired portion of the air present will be referred to as a carrier gas and is cycled and recycled through the distillation system by a blower (25) mounted in communication with the carrier gas lines (22, 4). Carrier gas flow is regulated by a gate valve (26) mounted in communication with the carrier gas lines (22, 4). The distiller's beer in the feed tank (32) is heated through an in-tank heat exchanger (30, 31) containing heated water cycled from the heated liquid tank (41). The heat source (48) may be but is not limited to low grade sources such as heat recovered from industrial operations or natural systems such as solar thermal or geothermal operations. This heated beer is then moved by pump (35) under pressure through spray heads (3) mounted in the evaporator tank (1). The spray heads (3) are mounted in such a way to provide maximum carrier gas exposure in the evaporator tank (1). The carrier gas that is circulated through the distillation system by the blower (25) is heated by the heated beer spray from the spray heads (3) causing some of the beer to be evaporated leading to saturation of the carrier gas with distillers beer vapors. The beer not evaporated flows from the evaporator tank (1) back to the heated feed tank (32) for recycle. The exit line (7) for carrier gas/vapor in evaporator tank (1) leads to a knockout pot (9). The knockout pot (9) serves two purposes. Porous packing material in the knockout pot (9) removes non-evaporated liquid entrained in the carrier gas/vapor. In the later stages of distillation when alcohol concentration in the beer is low, a heat exchanger (30, 31) mounted in the top of the knockout pot (9) is activated. Cooling water is introduced into the heat exchanger (30, 31) liquefying small amounts of vapor that coat the packing material. The interaction between the rising carrier gas vapor and the falling condensed liquid coating the packing material, leads to a higher alcohol percentage in the vapor stream. This later step is called rectification. Any liquid that is removed during rectification through the liquid drain (13) on the knockout pot (9) is recycled to the heated feed tank (32), complete line not shown. The carrier gas/vapor is then channeled into the condenser(s) (16) where it comes in contact with an internal cool heat exchanger(s) (17, 18). The temperatures of the circulating gases are lowered causing condensation of some of the vapor from the carrier gas. This condensate(s) (distillate product) is removed from the condenser(s) (16) through one or more product removal line(s) (19). The chilled water used in the cool heat exchanger(s) (17, 18) is pumped from the cool water source (47). The now cooled dryer carrier gas is channeled through the line (22) to the blower (25) where it is recycled through the system.

The present embodiment for most applications will not need sterilization. In other applications the post distillation equipment may need sterilization. In such cases ozone or ultraviolet sterilization usually be will be adequate. Disinfection of the systems in the present embodiment could also be achieved using chlorine produced by the onsite electrolysis of saltwater. The chlorine will be deactivated by passing the wash water or gas through an activated carbon filter before disposal.

A preferred embodiment is described above. However, it is to be understood that various changes can be made with respect to the described embodiment and all such changes as within the true spirit and scope of the claimed invention are intended to be included in the accompanying claims.

INDUSTRIAL APPLICABILITY

The distillation system, according to the description above has the effect of being able to distill alcohol, water and other volatile chemical solutions at temperatures significantly lower than the boiling point of those solutions. This means that the heat needed to run the system can be recovered from waste heat streams, from environmental heat sources or other low-grade heat sources. Because of the low temperature used, inexpensive materials can be used in the construction of these units for certain applications. In addition, a non-oxygen gas environment allows oxygen sensitive materials to be distilled. Further, the system can be modified to reduce the volume of waste streams such as fracking fluids, paper production waste and other industrial streams. The use of non-clogging spray heads (3) in the evaporator tank (1) and easy access to the systems interior, facilitate a wide application for the described distillation system.

The carrier gas under the above described conditions will become saturated with liquid vapor. The higher the temperature, of the dry carrier gas, the higher concentration of vapor that carrier gas can carry. When an alcohol water mix such as distiller's beer is heated and sprayed into a stream of carrier gas moving through the evaporator tank (1), the carrier gas is heated and becomes saturated with distiller's beer vapors. The carrier gas/vapor mix will also entrain small amounts of un-vaporized beer. For this reason, the heated carrier gas/vapor mix is passed through the knockout pot (9) that contains porous packing material. The small droplets of un-vaporized liquid adhere to the packing material producing a clean carrier gas/vapor stream. Upon entrance into the condenser tank (16), the carrier gas/vapor is cooled when it comes in contact with the internal coldwater heat exchange coils (17, 18). The vapor carrying capacity of the carrier gas decreases as it is cooled leading to condensation of most of the vapor. The liquid condensate is removed as spirit distillate and the dryer cool carrier gas is channeled through the blower (25) for another pass. Near the end of the distillation process, the percent of alcohol in the distilled liquor may need enhancement. A simple change in the configuration of the knockout pot (9) can convert this system to both a knockout pot and a rectifier. A rectifier increases the alcohol concentration in the vapor in the following way. A small cold-water condenser mounted on top of the packing material in the knockout pot (9) will condense a small portion of the beer vapor in the carrier gas. The condensate produced, containing a higher alcohol concentration than the beer injected into the evaporator tank (1), coats the packing material. The interaction of the incoming vapors with the higher alcohol condensate on the packing material results in a higher alcohol concentration in the carrier gas/vapor stream.

Product Made by Process

The above process produces a high-quality consumable spirit product. Due to the unique distillation conditions (low temperature distillation in a low oxygen environment at atmospheric pressure) the spirit products do not need redistillation. In addition, the spirit products are smooth to taste and the process eliminates some of the by-products that are suspected of producing off taste or hangovers. As such, the spirit products can be considered quality sipping liquors.

By utilizing different distiller's beer, one can produce primary distillates that can be consumed directly or used to the produce brandy, vodka, gin, whisky, rum, scotch and other consumable spirits. Because of the nature of the distillate, it may not be necessary to age the products as long as conventional spirits in order to achieve a smooth, high quality product. The uniqueness of products produced using the above process description should allow them to be valued as quality products separate from those produced using conventional distillation processes.

Optional Systems

The above system for converting the batch distillation process in the embodiment of the present description to: (1) an automated continuous beer feed process; (2) a temperature controlled companion fuel powered heat system that operates when the main low temperature heat recovery system cannot provide enough heat to the heated liquid tank; (3) a wash system for automatic cleaning of the areas in the distillation system that involve beer contact; and (4) a method for automatic cleaning and sterilization of the distillation system are also contemplated within the scope of the description above.

Other Applications

Low temperature distillation in a low oxygen environment at atmospheric pressure in the embodiment described above can be applied to any process that involves purification of products that have a reasonable vapor pressure at the operational temperature stated above. Distillation of products using this system allows purification to be achieved at temperatures well below the boiling points of those products. Because of this, low grade heat resources, normally wasted, can be utilized to power the distillation process. The minimized oxygen and the distillation at normal pressure are especially attractive in the processing of combustible products. The purification of volatile bio-fuels such as methanol, ethanol, other alcohols and certain hydrocarbon products would work well. Certain industrial chemicals could be purified including alcohols, aldehydes, ketones, certain acids and hydrocarbon fractions and the like using this approach. Perhaps the most attractive applications are applying the described process above to large scale desalination of sea water and brackish water sources or to the clean-up and recovery of usable products from industrial waste waters such as fracking waste, paper waste and other contaminated waste streams. The most notable attribute of the described process is that it utilizes low grade heat sources such as industrial waste heat, environmental heat resources such as solar thermal and geothermal by-product heat, and recovery heat from combustion sources such as fossil fueled generators and other fueled motor applications to power the system. In certain applications, such as the distillation of oxygen sensitive materials or the distillation of materials that are temperature sensitive, this approach could be just as notable.

DRAWING REFERENCES & DESCRIPTION

Figure 2:
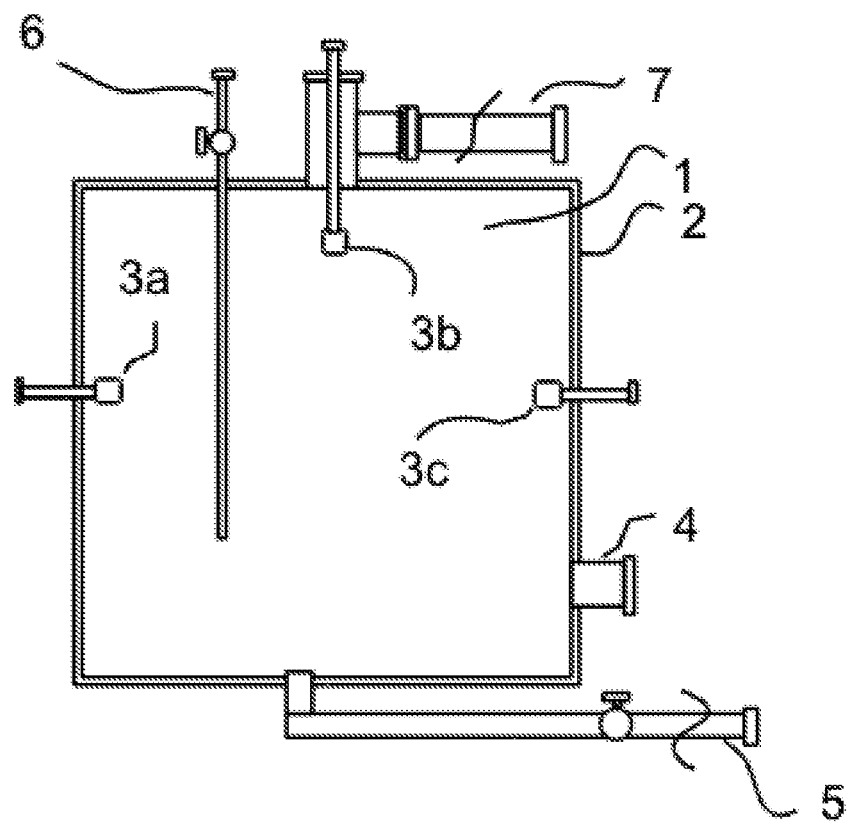
FIGS. 2-7 are explanatory views of each part of the described distillery.
Figure 3:
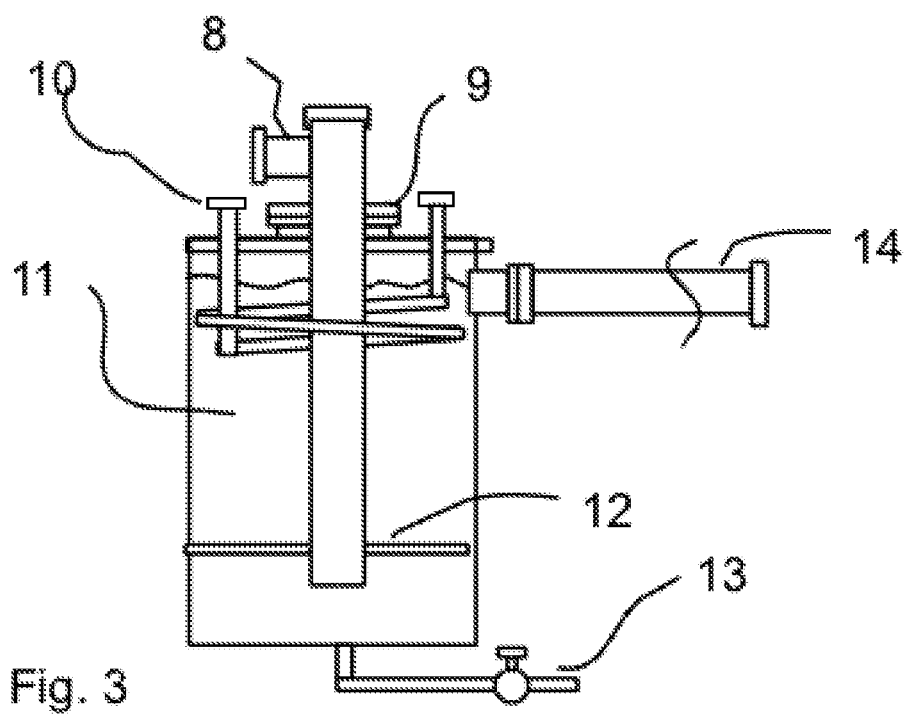
Figure 4:
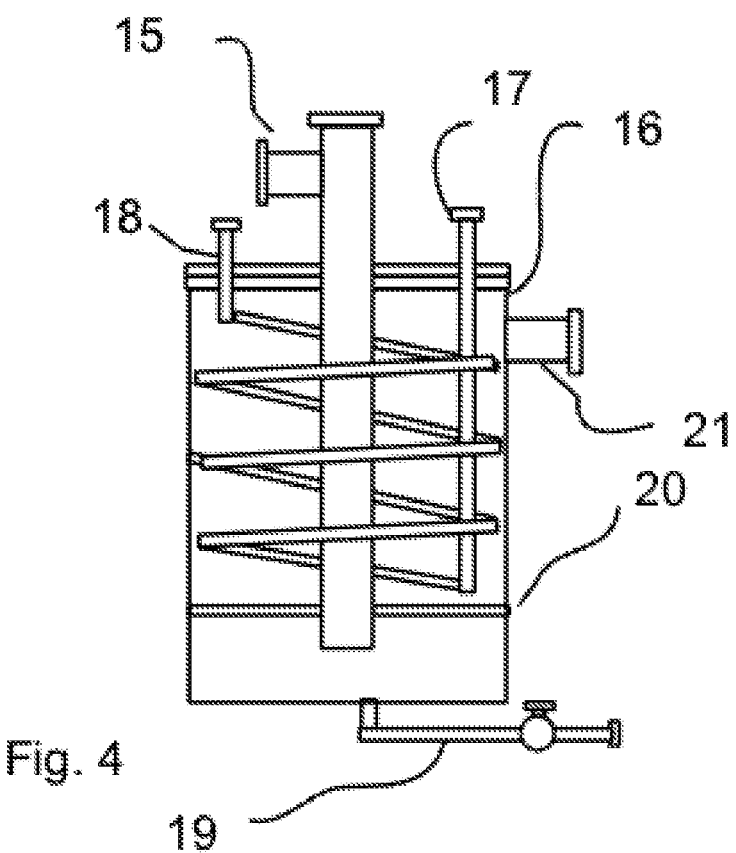
Figure 5:
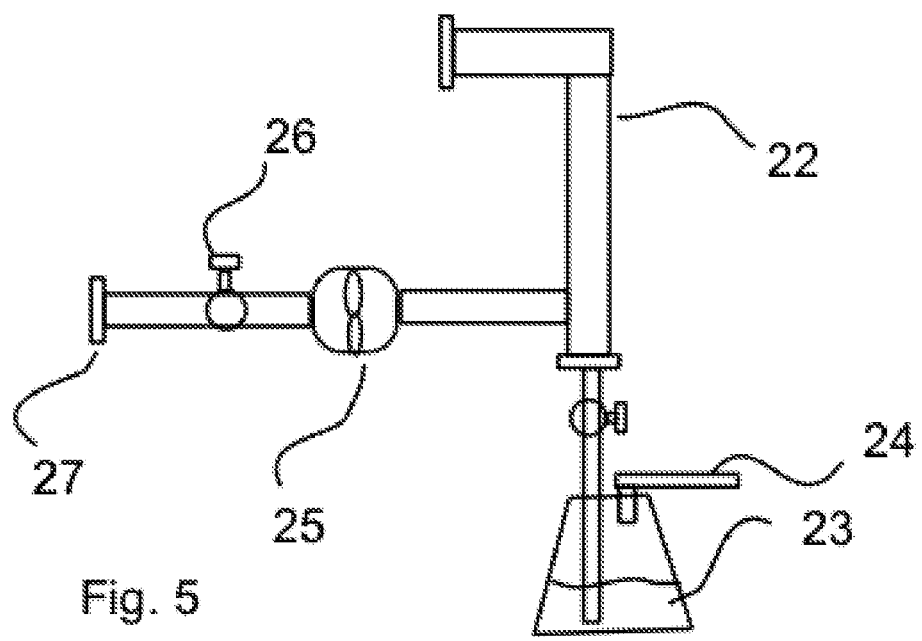
Figure 6:
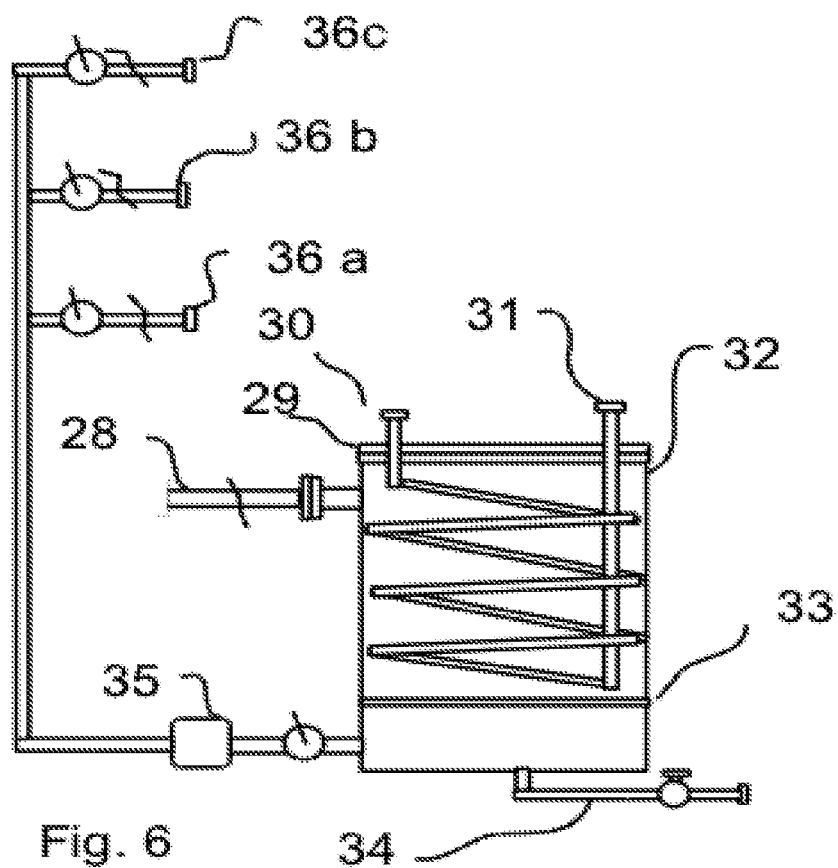
Figure 7:
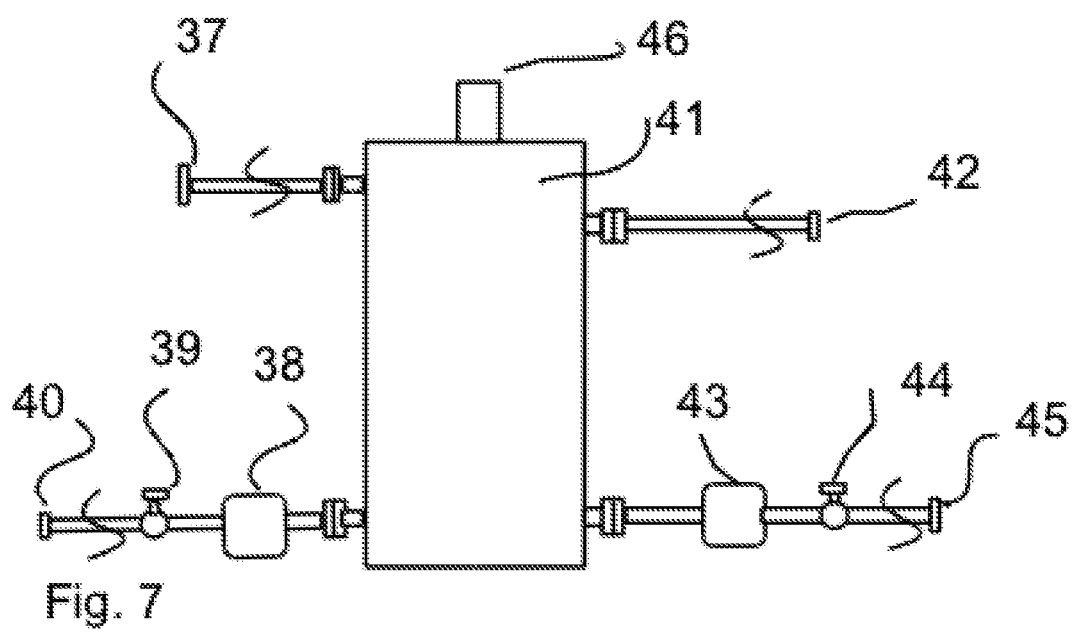

FIG. 2
evaporator tank
evaporator tank walls
3a side spray head
3b top spray head
3c opposite side spray head
4 recycle carrier gas/uncondensed vapor line
5 used beer return line
6 non-oxidizing gas injection line, i.e. nitrogen
7 carrier gas/vapor line leading to the knock-out pot (9)
FIG. 3
8 line receiving carrier gas/vapor from evaporator tank
9 knock-out pot with access tank cover
10 rectifier heat exchanger coils
11 stainless steel sponge packing
12 vapor/gas distribution plate
13 knock-out pot liquid drain
14 carrier gas/vapor line leading to the condenser tank(s) (16)
FIG. 4
15 line receiving carrier gas/vapor from the knockout pot (9)
16 condenser tank with access tank cover
17,18 corrugated stainless steel heat exchanger coils
19 condensate (distillate) product removal line
20 carrier gas/vapor distribution plate
21 carrier gas/vapor exit line
FIG. 5
28 line receiving carrier gas and vapor from the condenser tank(s) (16)
29 system hydrostatic pressure regulator
30, 31 excess carrier gas vent port and oxygen test sight
32 blower to recycle carrier gas and vapor through the system
33 gate valve to regulate carrier gas/vapor flow
34 carrier gas/vapor return line to evaporator
FIG. 6
28 used beer return from evaporator tank (1) to heated feed tank (32)
29 feed tank access cover
30, 31 corrugated stainless steel heat exchanger coil
32 heated feed tank
33 screen for solids retention
34 spent beer removal line
35 heated beer pump
36 a,b,c heated beer feed lines to evaporator (1) spray heads (3 a,b,c)
FIG. 7
37 heated water line return from the beer feed tank heat exchanger (30, 31)
38 heated water pump—pumps water from heated liquid tank to the feed tank heat exchanger
39 valve to regulate heated water flow
40 beer feed heat exchanger connecting pipe
41 heated liquid tank—Any heating liquid, including but not limited to water
42 heated water return from heat source (48)
43 pump that pumps water from the heated liquid tank to the heat source (48)
44 valve regulates water flow through the heat source (48)
45 outlet pipe from the heated water pump to the heat source (48)
46 vent
47 cool water source for condensers—(FIG. 1)—Any cooling liquid
48 Heat source—(FIG. 1)

Additional Description

An exemplary distillation system is illustrated in FIGS. 1-7 having an evaporator tank (1) with a wall (2) surrounding an interior evaporator tank area. A non-oxidizing gas line (6) is disposed at least partially outside the evaporator tank (1) in communication with the interior evaporator tank area, wherein the non-oxidizing gas line (6) introduces a non-oxidizing gas into the interior evaporator tank; the interior evaporator tank area is generally at or above an ambient atmospheric pressure. A nozzle system (3) is disposed at least partially inside the evaporator tank (1) in communication with a carrier gas. A knock-out pot (9) is disposed in communication with the evaporator tank (1) for receiving a first product from the evaporator tank (1). A condenser (16) is disposed in communication with the knock-out pot (9) for receiving a second product. A cool water heat exchanger (17, 18) is disposed at least partially inside the condenser (16). A recycle line (4, 22) having a first end and a second end is disposed between the condenser (16) and the evaporator tank (1) in communication with the condenser (16) and the evaporator tank (1). It is contemplated that one of the possible non-oxidizing gases is nitrogen. A rectifier (10) is disposed inside the knockout pot (9); the rectifier (10) is in selectable communication with a cool water source (47). The knock-out pot (9) includes a drain (13) at least partially disposed outside the knock-out pot (9). The knock-out pot (9) includes a second line (not shown) between the knock-out pot (9) and a heated feed tank (41) in communication with the knock-out pot (9) and the heated feed tank (41). The condenser (16) includes a condensate removal line (19) disposed at least partially outside the condenser (16) in communication with the condenser (16). A blower (25) is disposed between the first end and the second end of the recycle line (4, 22) in communication with the recycle line (4, 22). A hydrostatic pressure regulation system is disposed between the first end and the second end of the recycle line in communication with the fifth line having a vent in communication with the fifth line (4, 22) for excess carrier gas release. A gate valve (26) is disposed between the first end and the second end of the recycle line (4, 22) in communication with the recycle line (4, 22) for regulating carrier gas flow rates.

The distillation system of FIGS. 1-7 also shows an evaporator tank (1) having the wall (2) surrounding the interior evaporator tank area. The non-oxidizing gas line (6) is disposed at least partially outside the evaporator tank (1) in communication with the interior evaporator tank area, wherein the non-oxidizing gas line (6) introduces the non-oxidizing gas into the interior evaporator tank area; the interior evaporator tank area is generally at or above an ambient atmospheric pressure. The nozzle system having spray heads (3a, 3b, 3c) is disposed at least partially inside the evaporator tank (1) in communication with the carrier gas. A second line is disposed between the evaporator tank (1) and the knock-out pot (9) in communication with the evaporator tank (1) and the knock-out pot (9). A third line is disposed between the knock-out pot (9) and the condenser (16) in communication with the knock-out pot (9) and the condenser (16). A cool water heat exchanger (17, 18) is disposed at least partially inside the condenser (16). A fifth line having a first end and a second end, the fifth line is disposed between the condenser (16) and the evaporator tank (1) in communication with the condenser (16) and the evaporator tank (1). One of the non-oxidizing gases contemplated is nitrogen. The rectifier (10) is disposed inside the knockout pot (9). The rectifier (10) is in selectable communication with a cool water source (47). The knock-out pot (9) includes a drain (13) at least partially disposed outside the knock-out pot (9). The knock-out pot (9) includes a fourth line (not shown) between the knock-out pot (9) and a heated feed tank (32) in communication with the knock-out pot (9) and the heated feed tank (32). The condenser (16) includes a condensate removal line (19) disposed at least partially outside the condenser (16) in communication with the condenser (16). A blower (25) is disposed between the first end and the second end of the fifth line in communication with the fifth line. A hydrostatic pressure regulation system (23) is disposed between the first end and the second end of the fifth line in communication with the fifth line having a vent (24) in communication with the fifth line for excess carrier gas release. The gate valve (26) is disposed between the first end and the second end of the fifth line in communication with the fifth line for regulating carrier gas flow rates.

The evaporator tank (1) for distillation includes at least one wall (2) surrounding the interior evaporator tank area. The interior evaporator tank area is generally at or above an ambient atmospheric pressure. The non-oxidizing gas line is disposed at least partially outside the evaporator tank wall (2) in communication with the interior evaporator tank area where the non-oxidizing gas line (6) is configured to introduce the non-oxidizing gas into the interior evaporator tank area. The nozzle system having spray heads (3a, 3b, 3c) is disposed at least partially inside the evaporator tank (1) configured to be in communication with the carrier gas. The first exit line (7) is attached to the wall (2) of the evaporator tank (1) configured to allow a gas/vapor to exit the evaporator tank (1). A second exit line (5) is attached to the wall (2) of the evaporator tank (1) configured to allow a used liquid to exit the evaporator tank (1).

A beer cycle method is described having the feed tank (32) in communication with (a) the evaporator tank (1) and (b) the heated water tank (41), The evaporator tank (1) includes the wall (2) surrounding the interior evaporator tank area. The nozzle system having spray heads (3a, 3b, 3c) is disposed at least partially inside the interior evaporator tank area. The method includes the steps of: (a) adding a beer product into the feed tank (32); (b) moving a heated water from the heated water tank (41) through a heat exchanger (not shown) disposed at least partially inside the heated feed tank (32); (c) monitoring the beer product temperature; (d) pumping the beer product from the feed tank (32) through the nozzle system having spray heads (3a, 3b, 3c) and into the interior evaporator tank area; and (e) returning the un-evaporated beer from the evaporator tank (1) to the heated feed tank (32).

A carrier gas cycle method in a distillation system is described having the evaporator tank (1) with the wall (2) surrounding the interior evaporator tank area. The non-oxidizing gas line (6) is disposed at least partially outside the evaporator tank (1) in communication with the interior evaporator tank area; the interior evaporator tank area is generally at or above an ambient atmospheric pressure. The nozzle system having spray heads (3a, 3b, 3c) is disposed at least partially inside the evaporator tank (1). The knock-out pot (9) is in communication with the evaporator tank (1). The condenser (16) is in communication with the knock-out pot (16). The cool water heat exchanger (17, 18) is disposed at least partially inside the condenser (16). The steps of the carrier gas cycle method include: (a) injecting the non-oxidizing gas into the interior evaporator tank area through the non-oxidizing gas line (6); (b) circulating the carrier gas through the distillation system; (c) monitoring the carrier gas with the oxygen sensor (not shown) in communication with the distillation system; (d) providing a vent system (24) to allow excess carrier gas buildup to escape; and (e) maintaining a positive pressure in the distillation system. The positive pressure is a pressure above the ambient atmospheric pressure.

A carrier gas saturation method in a distillation system is also provided having the evaporator tank (1) with the walls (2) surrounding the interior evaporator tank area. The non-oxidizing gas line (6) is disposed at least partially outside the evaporator tank (1) in communication with the interior evaporator tank area; the interior evaporator tank area is generally at or above an ambient atmospheric pressure. The nozzle system having spray heads (3a, 3b, 3c) is disposed at least partially inside the evaporator tank (1). The knock-out pot (9) is in communication with the evaporator tank (1). The condenser (16) is in communication with the knock-out pot (9). The cool water heat exchanger (17, 18) is disposed at least partially inside the condenser (16). The steps of the carrier gas cycle method include: (a) injecting the non-oxidizing gas into the interior evaporator tank area through the non-oxidizing gas line (6); (b) saturating the carrier gas by injecting a beer vapor into the interior evaporator tank area making a saturated carrier gas; (c) removing un-vaporized beer in the knock-out pot (9); (d) cooling the saturated carrier gas in the condenser (16); (e) removing a condensate product from the condenser (16); and (f) recycling the saturated carrier gas into the evaporator (1).

A feed tank method in a distillation system is also provided having the evaporator tank (1) with the walls (2) surrounding the interior evaporator tank area. The nozzle system having spray heads (3a, 3b, 3c) is disposed at least partially inside the evaporator tank (1). The knock-out pot (9) is in communication with the evaporator tank (1). The condenser (16) is in communication with the knock-out pot (9). The cool water heat exchanger (17, 18) is disposed at least partially inside the condenser (16). The feed tank (32) with the heat exchanger (not shown) is disposed at least partially within the feed tank (32) in communication with the nozzle system having spray heads (3a, 3b, 3c). The pump (35) is in communication with the feed tank (32) and the evaporator tank (1). The steps of the feed tank method include: (a) heating a fermented product in the feed tank (32) to between 120° and 180° and heating the fermented product to between 120° and 155° reduces the higher temperature fusel oils, (b) pumping the heated fermented product from the feed tank (32) into the interior evaporator tank area through the nozzle system having spray heads (3a, 3b, 3c), (c) removing the un-vaporized liquid in the knock-out pot (9), and (e) condensing an alcohol in the condenser (16). The feed tank method includes the pump (35) for (d) pumping the heated fermented product into nozzle system having spray heads (3a, 3b, 3c) in the evaporator tank. The steps include (e) a way to recycle un-evaporated fermented product from the evaporator tank (1) back into the feed tank (32) where it is reheated and re-injected. Here, the non-oxidizing gas line (6) is disposed at least partially outside the evaporator tank (1) in communication with the interior evaporator tank area. The blower (25) recycles the carrier gas and un-condensed vapor through evaporator tank (1) and the rest of the system. A knockout pot (9) is shown for removal of un-evaporated liquid from the carrier gas exiting the evaporator tank (1) and one or more condenser tanks (16) are provided for condensing alcohol containing carrier gas. The pressure regulation system (not shown) keeps the system at a pressure slightly above atmospheric pressure.

The preceding description has been presented only to illustrate and describe exemplary embodiments of the methods and systems of the claims. It is not intended to be exhaustive or to limit the claims to any precise form disclosed. It will be understood by those skilled in the art that various changes may be made and equivalents may be substituted for elements thereof without departing from the scope of the description. In addition, many modifications may be made to adapt a particular situation or material to the teachings of the description without departing from the essential scope. Therefore, it is intended that the description not be limited to the particular embodiment disclosed as the best mode contemplated for carrying out this description, but that the description will include all embodiments falling within the scope of the claims. The description may be practiced otherwise than is specifically explained and illustrated without departing from its spirit or scope. The scope of the description is limited solely by the following claims.

What is claimed is:

1. A beer cycle method having a heated feed tank in communication with an evaporator tank, the evaporator tank having a wall surrounding an interior evaporator tank area, a nozzle system being disposed at least partially inside the interior evaporator tank area, the method comprising the steps of:
    (a) configuring the evaporator tank area to be operated at or slightly above an ambient atmospheric pressure;
    (b) adding a beer product into the heated feed tank;
    (c) pumping the beer product from the heated feed tank through the nozzle system and into the interior evaporator tank area, the nozzle system disposed at least partially inside the evaporator tank, the evaporation tank being in communication with a carrier gas, the nozzle system having a first opening in communication with the heated feed tank, the heated feed tank being configured to receive the beer product, and the nozzle system having a second opening configured to spray the beer product into the evaporator tank to at least partially form a vapor-carrier gas, the second opening being configurable to be operated to spray the beer product below 155 degrees Fahrenheit minimizing yeast cell destruction; and
    (d) returning an unevaporated beer product from the evaporator tank to the heated feed tank.

2. A carrier gas cycle method in a distillation system having an evaporator tank with a wall surrounding an interior evaporator tank area, a non-oxidizing gas line disposed at least partially outside the evaporator tank in communication with the interior evaporator tank area, a nozzle system disposed at least partially inside the evaporator tank, a knock-out pot in communication with the evaporator tank; a condenser in communication with the knock-out pot; a cooling heat exchanger disposed at least partially inside the condenser, the steps of the carrier gas cycle method comprising:
    (a) configuring the evaporator tank area to be operated at or slightly above an ambient atmospheric pressure;
    (b) injecting a non-oxidizing gas into the interior evaporator tank area through the non-oxidizing gas line, the interior evaporator tank area being at or above an ambient atmospheric pressure;
    (c) circulating the carrier gas through the distillation system;
    (d) monitoring the carrier gas with an oxygen sensor in communication with the distillation system;
    (e) providing a vent system to allow excess carrier gas buildup to escape;
    (f) pumping a beer product through the nozzle system and into the interior evaporator tank area, the nozzle system being disposed at least partially inside the evaporator tank, the evaporation tank being in communication with a carrier gas, the nozzle system having a first opening configured to receive the beer product, and the nozzle system having a second opening configured to spray the beer product into the evaporator tank to at least partially form a vapor-carrier gas, the second opening being configurable to be operated to spray the beer product below 155 degrees Fahrenheit minimizing yeast cell destruction; and
    (g) maintaining a slight positive pressure in the distillation system.

3. A carrier gas saturation method in a distillation system having an evaporator tank with a wall surrounding an interior evaporator tank area, a non-oxidizing gas line disposed at least partially outside the evaporator tank in communication with the interior evaporator tank area, a nozzle system disposed at least partially inside the evaporator tank, a knock-out pot in communication with the evaporator tank; a condenser in communication with the knock-out pot; a cooling heat exchanger disposed at least partially inside the condenser, the steps of the carrier gas saturation method comprising:
    configuring the evaporator tank area to be operated at or slightly above an ambient atmospheric pressure;
    (b) injecting a non-oxidizing carrier gas into the interior evaporator tank area through the non-oxidizing gas line;
    (c) saturating the non-oxidizing carrier gas by pumping a beer product through the nozzle system and into the interior evaporator tank area, the evaporator tank being in communication with the non-oxidizing carrier gas, the nozzle system having a first opening configured to receive the beer product, and the nozzle system having a second opening configured to spray the beer product into the evaporator tank to at least partially form a vapor-carrier gas, wherein the second opening is configured to spray the beer product below 155 degrees Fahrenheit to minimize yeast cell destruction;
    (c) removing an un-vaporized beer product in the knock-out pot;
    (d) cooling the saturated non-oxidizing carrier gas in the condenser;
    (e) removing a condensate product from the condenser; and
    (f) recycling the saturated non-oxidizing carrier gas into the evaporator.

* * * * *